United States Patent [19]

Froggatt

[11] Patent Number: 4,707,826
[45] Date of Patent: Nov. 17, 1987

[54] CIRCUIT AND PACKET DATA TRANSMISSION SYSTEM

[75] Inventor: Dennis G. Froggatt, Dunmow, United Kingdom

[73] Assignee: STC plc, London, England

[21] Appl. No.: 749,216

[22] Filed: Jun. 27, 1985

[30] Foreign Application Priority Data

Jul. 17, 1984 [GB] United Kingdom ............... 8418121

[51] Int. Cl.⁴ ........................................... H04Q 11/04
[52] U.S. Cl. .................................................. 370/60
[58] Field of Search ................. 370/60, 94, 110.1, 89, 370/58

[56] References Cited

U.S. PATENT DOCUMENTS

| | | | |
|---|---|---|---|
| 4,154,983 | 5/1979 | Pedersen | 370/89 |
| 4,251,880 | 2/1981 | Baugh et al. | 370/89 |
| 4,482,999 | 11/1984 | Janson et al. | 370/89 |
| 4,538,263 | 8/1985 | Gabrielli et al. | 370/89 |
| 4,663,755 | 5/1987 | Lewis | 370/60 |

Primary Examiner—Douglas W. Olms
Assistant Examiner—Frank M. Scutch, III
Attorney, Agent, or Firm—Kerkam, Stowell, Kondracki & Clarke

[57] ABSTRACT

In a data transmission system of the TDM type both circuit-switched and packet-switched connections can be set up. Circuit-switched connections, being real time, e.g. voice, are given priority, but all time slots are available for packets when not in use for circuit-switched connections. Thus the ratio of the two types of connections is automatically adjusted according to traffic conditions.

2 Claims, 5 Drawing Figures

CIRCUIT AND PACKET DATA TRANSMISSION SYSTEM

BACKGROUND OF THE INVENTION

This invention relates to transmission systems handling both circuit switched traffic and packet switched traffic.

Most telephone systems exist to provide a "circuit switched" speech information service, and represent a substantial capital investment. During recent years there has been a rapidly increasing demand for digital data information resulting in additional dedicated networks, both circuit switched and packet switched. In addition, much work has been done to adapt existing telephone networks to carry data traffic.

The development of digital transmission and switching has accelerated this trend by enabling the provision of a completely digital network comprising entirely electronic devices, culminating in the imminent introduction of an ISDN (Integrated Services Digital Network) which provides simultaneous access for telephone and data subscribers on the same circuit.

Frequently independently-operated circuit switched and packet switched networks provide services to subscribers in the same area. System nodes may even be co-located and the duplication of trunk transmission facilities represents an uneconomic use of available capital resources.

RELATED PRIOR ART

Systems are already known in which the same transmission medium, or bearer, is used to convey both speech (which is normally circuit-switched) traffic and data (which usually does not need to be "real time"). One example is British Pat. No. 1005075 (IBM), which is typical of systems in which data is "fitted into" gaps in the analogue speech. Another system of this type is described in U.S. Pat. No. 3303285 (Warren G. Brown), to which corresponds British Pat. No. 1021927 (STC).

The system of the Brown Patent extends the above dual use of the medium to systems in which both voice and data are conveyed digitally. In that system, when there is a gap in voice, the medium is taken over wholly for data until the data to be sent has all been sent. Thus the medium may be denied to voice for relatively long periods, which is clearly a significant disadvantage.

Other systems in which intelligence of different sorts are mixed onto one bearer include those of British Pat. No. 1186385 (Hasler), British Pat. No. 1463002 (Siemens-Albis AG), and British Pat. No. 2006574B (CSELT), and in European patent application No. 082333A1 (IBM) which are of lesser interest than the systems mentioned above. Of more interest is the system of British Pat. No. 1486105 (IBM) in which both synchronous (circuit-switched) and asynchronous (packet-switched) traffic is handled. Here the proportion of the bearer bandwidth available for the two types of traffic varies, but the bandwith is never wholly available for either sort of traffic. This can cause unacceptable delays to circuit-switched traffic, and also a loss of economy when packet traffic is light.

SUMMARY OF THE INVENTION

An object of the invention is to provide a system in which the principles of using a transmission medium or bearer for different types of traffic are extended.

According to the present invention, there is provided an electrical intelligence transmission system, in which both circuit-switched connections and packet-switched connections can be set up, circuit-switched connections having priority over packet-switched connections, in which a said circuit-switched connection is set up using a free one of a number of time slots in a time division multiplex transmission system, in which at any time at which one or more circuit switched connections are in existence the remainder of the system bandwidth is available for the establishment of packet-switched connections, in which if all time slots are in use for circuit-switched connections any packets awaiting transmission are stored in buffer storage means, being released via the transmission medium as and when time slots become available, and in which the sharing of the transmission medium between the circuit-switched connections and the packet-switched connections is adjusted dynamically in accordance with the traffic offered to the system and without interference with connections which have already been set up.

While the principles outlined herein can be applied to new systems, basic ideas can be used to update existing systems.

DESCRIPTION OF THE PREFERRED EMBODIMENT

Traffic

Telecommunication networks comprise a number of nodes, to which subscribers gain access, which nodes are interconnected by a mesh of trunk transmission circuits. Although it is possible to provide sufficient paths for all subscribers to be simultaneously engaged on calls, in practice the number of paths is normally limited to what provides a satisfactory "grade of service" during busy periods. Thus during normal service, a significant proportion of these circuits carry no traffic.

Circuit-switched traffic is characterised by its real-time constraints so that calls which cannot immediately be set up due to congestion are lost and have to be set-up again at a later time.

Packet-switched traffic on the other hand does not have such real time constraints. Packets queue for service and are often connected in a manner dictated by a prearranged signalling exchange, so that the data experiences a variable transmission delay.

In a system of shared resources it is important to so design that the number of circuit-switched calls lost and the amount of packet delay are minimised. However, advantage is taken of the facts that most of the time most circuit-switched capacity is unused and only for very short periods of time is it all needed. For example, a typical circuit-switched subscriber (voice) is assumed to generate 0.3 Erlangs of traffic, and a typical packet-switched subscriber (data) is assumed to generate 100 bits/second including overheads. Thus on a 64 Kbit/s circuit there can be some 200:1 difference between the loading of the two types of subscriber.

Architectures

Figure 1:
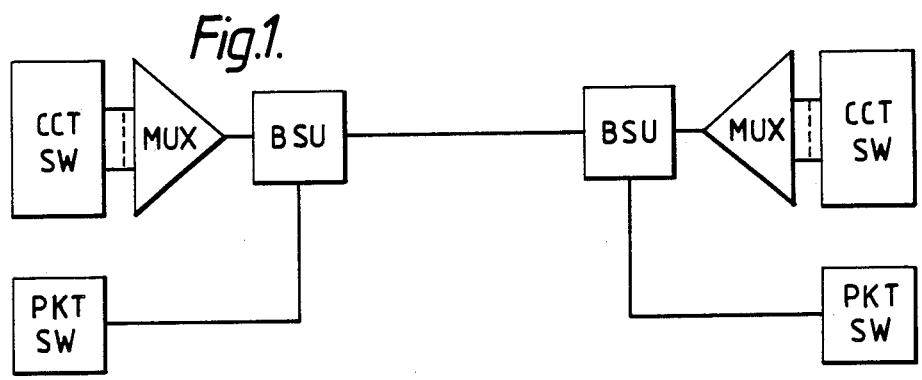
FIG. 1 is a highly schematic representation of a system embodying the invention.

A typical digital trunk interconnection for circuit switched information provides bearer capacity of 2 Mbit/s, divided into 30 channels of 64 Kbit/s and two additional channels for frame alignment and signalling. The present system, see FIG. 1 adds a Bearer Sharing Unit (BSU) at each end of the interconnection so that the outputs of both a circuit-switch and packet switch can efficiently share the transmission resource.

The method is, of course, equally valid for larger and smaller multiplexes and for different channel bit rates, e.g. 16 Kb/s delta modulation.

Principles

The principles adopted in the present system are:
(i) Circuit-switched information is given priority of use of the transmission resource.
(ii) Packet-switched information is handled by that part of the transmission resource not used for circuit-switched traffic.
(iii) The division of the resource is adjusted dynamically and without interference to the traffic.
(iv) Delays to the transmission of information packets due to congestion are minimised.
(v) Digital integrity of data carried on a circuit-switched connection or within a packet is maintained.
(vi) Sharing is implemented with least modification to existing switches and transmission equipments.

Basic Method

Circuit-switched connections are established, selecting and using available communication channels in the normal manner. Packet-switched connections are also established in the normal manner, but the assembled packets are transmitted using all the available capacity which is not used in circuit switched connections or other dedicated services, e.g. signalling.

Figure 2:
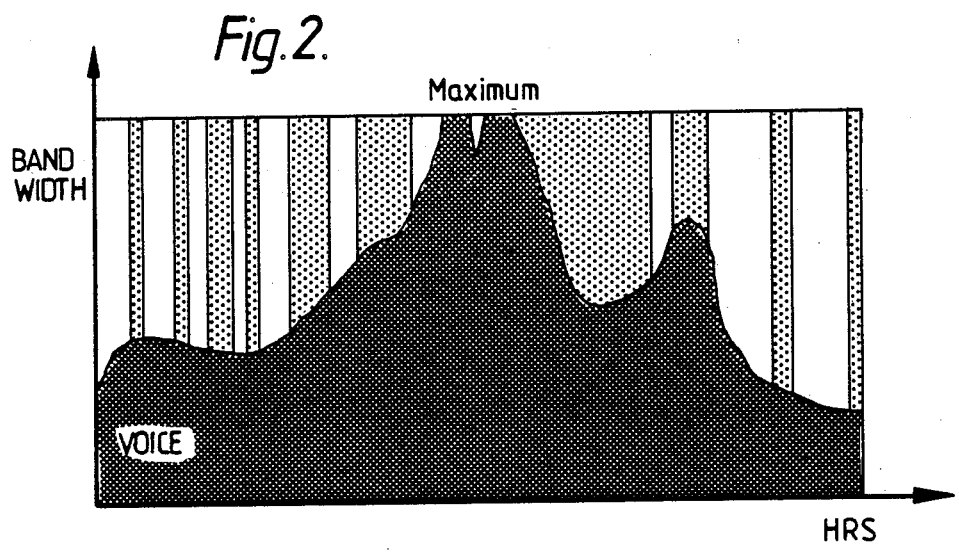
FIG. 2 is a traffic diagram useful in explaining how the bandwidth of the system is used.

FIG. 2 illustrates the utilisation of bandwidth in a typical case where initially both circuit and packet switch data traffic are lightly loaded, giving periods of no packets to be transmitted. When circuit-switched data demand requires all channels, the packet data is held back and, when channels again become available the 'backlog' of data is released for an extended period. Thus the bandwidth available for the transmission of packets varies from 0 to 100% of the bearer capacity. The smaller the bandwidth the longer the delay experienced by the packets and the larger the bandwidth the faster can the 'backlog' be cleared. To accommodate this variable rate, the packets require to be stored—perhaps in the packet switch itself—and released under control of a clock whose transitions relate to available bit positions in the transmitted bitstream.

Figure 3:
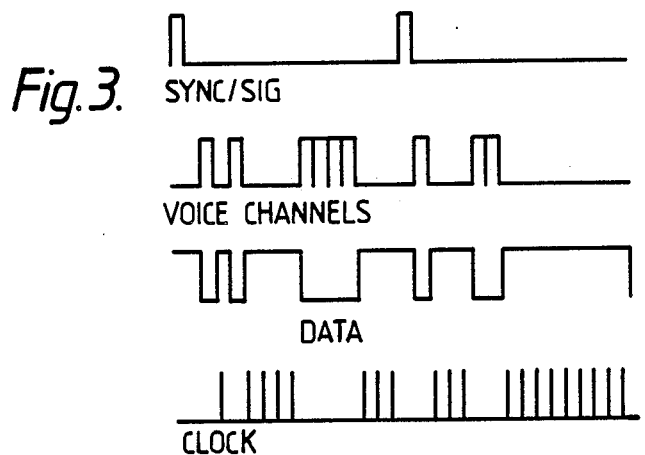
FIG. 3 shows multiplex frame and clock pulse sequences.

FIG. 3 illustrates a typical multiplex frame showing the channels selected for circuit-switched traffic, i.e. the voice traffic, and the clock required to ensure that the remaining channels are available to packet-switched data.

Figure 4:
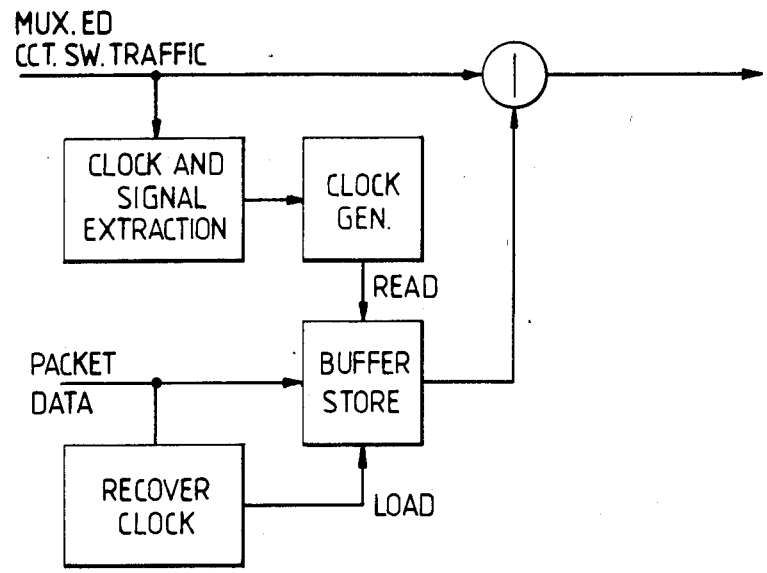
FIG. 4 is a simple representation of transmitter logic for the system of FIG. 1.

Having established a time division multiplex of circuit-switched traffic channels and a complementary bit stream of packet-switched traffic, the two are simply interlaced in order to produce a contiguous stream of bits for transmission, see FIG. 4.

While circuit switched connections are being handled, the clock and signal extraction unit extracts clock signals to maintain the local clock in synchronism. It also detects from the bit stream on the multiplexed input when a gap in the circuit-switched traffic occurs. Packet data enters the buffer store where it is loaded under the control of a clock recovery unit, which itself recovers clock from the packet data.

When the clock and signal generation circuit detects a gap in the circuit switched traffic, it energizes its read output to cause packets to be released from the packet store, which release continues until circuit switched traffic recommences, when packet transmission is terminated. In the meantime, new packet traffic is entering the buffer store. It will be noted that in times of little or no circuit switched traffic, a packet entering the buffer store may be sent out almost immediately.

Figure 5:
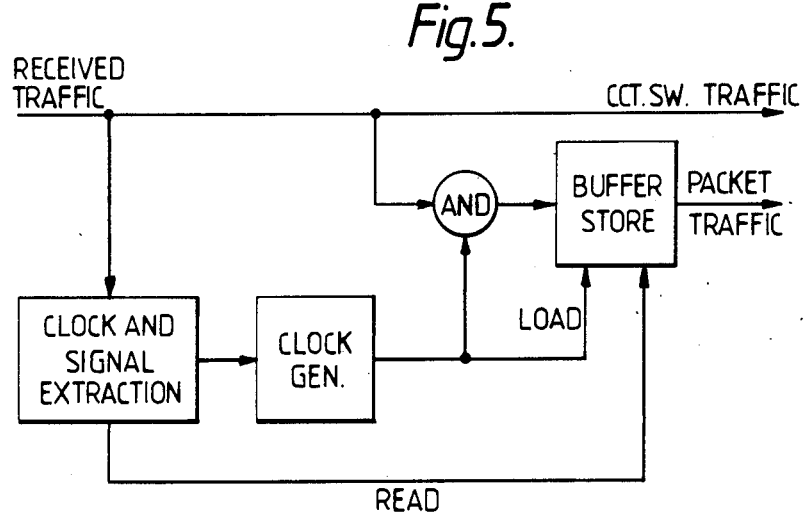
FIG. 5 is a simple representation of receiver logic for the system of FIG. 1.

At the receiving end the circuit-switched and packet-switched traffic are separated by an identically constructed clock and then handled by the respective exchanges in the normal manner—see FIG. 5.

At the receiving end, another clock and signal extraction unit controls the local clock generator. It will be seen that, since it is a real-time function, circuit-switched traffic goes straight through the circuit of FIG. 5. When the circuit determines from the signals in the bit stream that a packet is arriving, the clock generator opens the AND gate and energizes the LOAD input of the buffer store so that the latter receives the incoming packet bit stream. When the packet traffic ends, the LOAD input is de-energized and the AND gate closed. Read out from the buffer store is effected under control of clock and other signals from the clock and signal extraction unit.

The success of such a method depends upon the correct derivation of the clocks at the transmitting and receiving ends. Thus there should be no contention or ambiguity about the use of any bit, and the two clocks must be instanteously identical relative to the transmitted bit stream. This is ensured by the fact that both local clocks are, as described above, bit stream controlled.

Clock Generation

In order to generate the required clocks for mixing and separating the circuit and packet-switched traffic, it is necessary to know the free/busy state of each channel in the multiplex.

This channel state information can be obtained:
(a) directly from the exchanges or multiplexers at each end of the link;
(b) by analysis of the signalling sent by one exchange and received by the other.

The former method requires modification of the equipment involved and, therefore, if enhancement of existing systems is the objective, then the other method is preferable.

It is essential that the mixing clock at one end of the link and the separation clock at the other should be identical at all times, otherwise significant errors are introduced causing packets to require retransmission. Thus the process of clock generation consists of:
(1) detecting the change of state of a circuit-switched channel;
(2) adding or deleting the corresponding bit from the clock;
(3) ensuring that the change-over from the old to the new clock occurs between the same pair of multiplexed frames at each end of the link.

Signalling

During call establishment or release, signalling is sent from the exchange at one end of a trunk transmission link to that at the other, and identifies the relevant multiplexed channel which has to change state.

In digital transmission systems signalling is normally in a separate dedicated channel, and can take one of two forms:

(A) Associated Channel Signalling, in which the channel is further divided so that each sub-multiplexed channel is associated with a corresponding traffic channel.

(B) Common Channel Signalling, in which signalling messages are sent serially—each message being in accordance with a specified format that contains the channel and signalling information.

In the former case examination of the transmitted and received signals gives an indication of the state of the traffic channels in real time. Since the signalling is synchronised with the frame and processing delay can be precisely predicted, the changes in clocks can be accurately synchronised. In the case of common channel signalling, however, there are several factors which prevent such synchronism being achieved:

(i) signalling messages may not necessarily follow the same route as traffic;
(ii) messages may be received in error and retransmission requested;
(iii) messages may be interleaved with other messages thus introducing a variable transmission access delay;
(iv) received messages may be queued for access to the processing function;
(v) processing itself may require a variable time for execution.

Thus an additional real time signal is needed to enable the change from old clock to new clock to take place synchronously. Such a signal may be conveniently combined with the frame alignment signal, e.g. in a system in which the frame alignment signal is sent in alternate frames and in the other frame certain bits are freely available for international and national requirements. Note that because of the serial nature of message transmission and processing, only one channel of the clock can change at a time and the interval between changes is constrained by the length of the messages. To minimise errors this synchronisation signal should have at least two states so that a change of clock is indicated by a change in synchronisation signal. An even more secure and flexible signal would indicate the position (i.e. Channel No.) of the last clock bit to be changed.

Resynchronisation

It is inevitable that at some stage the two clocks will lose synchronism and it is necessary that a resynchronisation method should be available.

The signalling information only indicates changes, so it is necessary to force both ends to return to a reference condition from where new synchronised clocks can be derived. Such a reference assumes that all channels available to circuit switching are carrying traffic and therefore minimum bandwidth is available for packet-switched traffic. This increases gradually as circuit-switched channels are released but it will be some time before maximum efficiency is regained.

The bit position synchronisation signal referred to in the previous section may provide a means of accelerating this process.

I claim:

1. An electrical intelligence transmission station, in which all intelligence is conveyed in digital manner and both circuit-switched traffic and packet-switched traffic are handled, which station includes:
   (a) first control means for establishing priority of the circuit-switched
   (b) traffic over the packet-switched traffic; time division multiplex means responsive to the presence of circuit-switched traffic to establish connections appropriate to that traffic using available time slots of the multiplex means, said miltiplex means being able to use all available traffic-handling bandwidth;
   (c) buffer storage means into which packet-switched traffic is routed when all available system bandwidth is being used for circuit-switched traffic;
   (d) control means for the system which allocates system bandwidth not in use for circuit-switched traffic to packet-switched traffic, which control means functions under the control of traffic monitoring means which monitors the incidence of circuit-switched traffic;
   (e) means responsive to the detection by said monitoring means that all system bandwidth is in use for the handling of circuit-switched traffic to route any packet-switched traffic into said buffer storage means;
   (f) means responsive to the detection that bandwidth has become available due to the termination of one or more circuit-switched connections to route any packet-switched traffic in said buffer storage means to the station's output; and
   (g) common channel signalling means via which control information for the establishment of circuit-switched connections is sent from the station over its output;
   the arrangement being such that the sharing of the transmission medium between the circuit-switched traffic and the packet-switched traffic is adjusted dynamically in accordance with the levels of traffic offered to the system and without interference with existing connections.

2. The intelligence transmission station of claim 1 further including clock means for controlling the shared propagation time of transmission bandwith.

* * * * *

UNITED STATES PATENT AND TRADEMARK OFFICE
CERTIFICATE OF CORRECTION

PATENT NO. : 4,707,826

DATED : November 17, 1987

INVENTOR(S) : Froggatt

It is certified that error appears in the above-identified patent and that said Letters Patent is hereby corrected as shown below:

Claims:
Column 6, line 14, section (a) after "circuit-switched" insert
 --traffic over the packet-switched traffic;--.
Column 6, line 16, section (b) delete "traffic over the
 packet-switched traffic".

Signed and Sealed this

Seventeenth Day of May, 1988

Attest:

DONALD J. QUIGG

*Attesting Officer*   *Commissioner of Patents and Trademarks*